United States Patent [19]
Kearns et al.

[11] 3,870,585
[45] Mar. 11, 1975

[54] APPARATUS AND METHOD FOR EVAPORATIVE CONCENTRATION OF AQUEOUS SOLUTIONS AND SLURRIES

[75] Inventors: Tommy Carter Kearns, Lisle; Donald A. Stoltenberg, Park Ridge, both of Ill.

[73] Assignee: Pureco Systems, Inc., Rosemont, Ill.

[22] Filed: Feb. 15, 1973

[21] Appl. No.: 332,596

[52] U.S. Cl. ............ 159/4 A, 159/6 R, 159/13 C, 159/48 L, 159/49, 159/DIG. 13, 159/DIG. 6, 159/16 R

[51] Int. Cl. ......... B01d 1/22, B01d 1/16, F26b 3/12

[58] Field of Search .... 159/13 R, 13 A, 13 B, 13 C, 159/16 A, 49, DIG. 6, 6 R, 4 A, 4 B, 48 R, 48 L, DIG. 13; 263/14; 201/23, 32–34; 23/307; 423/178; 239/132

[56] References Cited
UNITED STATES PATENTS

| | | | |
|---|---|---|---|
| 1,830,174 | 11/1931 | Peebles | 159/4 R |
| 2,562,473 | 7/1951 | Majonnier | 159/4 A |
| 2,640,761 | 6/1953 | Wiseman | 23/275 |
| 2,779,724 | 1/1957 | Dunning et al. | 159/13 C X |
| 2,992,141 | 7/1961 | Peebles | 159/4 S UX |
| 3,057,700 | 10/1962 | Gross | 23/283 |
| 3,211,538 | 10/1965 | Gross et al. | 23/300 |
| 3,212,559 | 10/1965 | Williamson | 159/13 C X |
| 3,439,724 | 4/1969 | Mason | 159/49 X |
| 3,574,051 | 4/1971 | Shah | 159/47 WL |
| 3,743,483 | 7/1973 | Shah | 159/13 C X |

*Primary Examiner*—Jack Sofer

[57] ABSTRACT

This invention relates to an apparatus and method for evaporative concentration of aqueous solutions and slurries which utilizes as the evaporative unit a wet-wall direct heat exchange evaporator. In a preferred embodiment, an open flame jet operates within a descending liquid vortex, radiant heat being transferred from the flame to the liquid on the walls of the evaporator, and the hot combustion gases being intermixed with the exiting liquid for sensible heat transfer. By special means and method steps scale formation is avoided and the solids are precipitated in filterable form. The apparatus and method are particularly adapted for the restorative processing of spent aqueous sulfuric acid pickling liquors which contain high concentrations of metal salts, including salts such as ferrous sulfate, which exhibit reverse solubility characteristics.

33 Claims, 7 Drawing Figures

APPARATUS AND METHOD FOR EVAPORATIVE CONCENTRATION OF AQUEOUS SOLUTIONS AND SLURRIES

BACKGROUND AND SUMMARY

When a water solution containing dissolved solids is subjected to evaporative concentration on a heat exchange surface, solids may be precipitated from the solution onto the heat exchange surface, reducing the efficiency of heat transfer, and causing a buildup of deposited scale which can require frequent shut-down of the apparatus for cleaning. This problem is particularly acute for reverse solubility salts, which exhibit decreasing solubility of the salts as the temperature of their water solutions increase. With indirect heat transfer, the hottest portion of the liquid is the film in contact with the heat exchange surface. Consequently, where the main body of the liquid is saturated with a reverse solubility salt, the higher temperature of the film adjacent the heat transfer surface will cause supersaturation with resultant deposit of the salts in the form of scale. For this reason, it has been proposed to utilize wet wall direct heat exchange evaporators (see for example, U.S. Pat. Nos. 2,327,039 and 2,394,643). Heretofore, however, such evaporator apparatus has had relatively low evaporative capacity in relation to size, and have scaling because of evaporative drying at the wet dry transition areas necessitating shut-down for cleaning out the scale.

Where a direct flame and/or hot gases are to be used for evaporative concentrations of aqueous solutions or slurries, other burner and evaporator designs have been proposed, such as those illustrated in U.S. Pat. Nos. 3,104,947 and 3,212,559. In the design of 3,104,947, a submerged combustion principle is employed, the burner unit being immersed in the liquid to be evaporated. In the design of U.S. Pat. No. 3,212,559, the burner unit is also surrounded by a flowing stream of liquid, while the combustion gases are directed within a descending liquid curtain. While such designs may be satisfactory for limited concentration of certain aqueous solutions, they are impractical for concentrating to the solubility point the solutions of solids subject to scaling, such as reverse solubility inorganic salts. In both designs, walls heated by the burner are in indirect heat exchange relation with the solution being concentrated, thereby making these surfaces subject to scale formation and the liquid passages in contact therewith subject to solids plugging.

There is a further problem in the operation of wet-wall evaporators which results in the accumulation of solids and scale adjacent the feed inlet. This occurs when the liquid feed is brought into the upper portion of the evaporator and distributed therearound for downward flow along the walls of the evaporator. In the upper portion of the evaporator, there will be a transition zone from surfaces which are continuously in contact with the incoming feed to surfaces which are out of direct contact with the feed and therefore relatively dry. This wet-dry transition zone will fluctuate on the feed inlet and distribution surfaces, and droplets of the liquid may be thrown upwardly above the normal surface level of the incoming feed. Consequently, small portions of the liquid may evaporate to dryness on the surfaces immediately above the wet-dry transition zone, leading to solids deposit and scale formation on these surfaces. It will be appreciated that where the dissolved solids have a reverse solubility characteristic this problem may be aggravated, but that any solids may cause scale formation where the solution is evaporated to dryness.

Still another problem arises by the instantaneous drying of an air-borne mist of the solution being concentrated. With high volume fluid flow along the walls of a wet-wall evaporator, the formation of such aerosol mist is difficult to avoid. Consequently, where a direct flame and/or a stream of hot combustion gases is introduced into the air space between the walls of the evaporator, instantaneous heating and drying of the aerosol mist can occur. Solids thus formed may be extremely fine, approaching the colloidal size range. The accumulation of such ultra fine solids in the solution being concentrated may make it difficult to filter or separate. This problem is particularly acute where a high temperature flame jet is used within the evaporator, and when the dissolved material or solids of the slurry are subject to thermal decomposition. For example, it has been discovered that where the solution contains ferrous sulfate, and a fine mist or aerosol of this solution comes in contact with the burner flame, the mist is instantly dried and calcined to a very finely divided form of FeO, which if allowed to accumulate in the solution, may blind the filter and render it inoperable. The decomposition gas (viz. $SO_2$ or $SO_3$) is also undesirable.

The tube or jacket surrounding the burner flame or incoming combustion gases is also subject to troublesome scale formation. An aerosol mist or even larger droplets of the solution being evaporated can come in contact with the outside of this jacket or tube which will be heated to a high temperature, and thereby cause virtually instantaneous evaporation to dryness of any droplets or mist of the solution coming in contact therewith. With high volume flow of feed stock in an evaporator, it is virtually impossible to prevent droplet formation.

In considering the use of a direct heat exchange wet-wall evaporator for recovery processing of spent acid pickling liquors, all of the above problems are involved and also other specific problems relating to the highly corrosive nature of the liquor to be processed and the need to remove large amounts of metal salt to recover the free acid from the spent pickling liquor. Water solutions of inorganic acids, particularly sulfuric acid or hydrochloric acid, are employed for cleaning the surfaces of metals, particularly for cleaning steel. In the cleaning process, the acid reacts with the metal to form metal salts, such as ferrous sulfate, zinc sulfate, etc. After a period of use, the pickling liquor will become so contaminated with the metal salts that it must be discarded. Probably the most commonly used pickling liquor for cleaning steel is aqueous sulfuric acid which during use becomes contaminated with high concentrations of ferrous sulfate. While this spent liquor still contains an appreciable amount of unreacted sulfuric acid, it has traditionally been dumped into the sewer or nearby river or lake. Currently much pickle liquor is hauled to deep wells for underground disposal. In some cases the acid has been neutralized with an alkali, thus precipitating voluminous ferrous hydroxide sludge. This sludge is typically retained in large lagoons, allowed to dewater over several months, and eventually is dredged up and hauled to landfill.

If the iron salts could be removed from the spent pickle liquor, then the unused acid portion could be returned to the process and used.

The ferrous sulfate produced from this process is a reusable by-product material.

Prior to the present invention, it is believed that the most successful commercial method of recovering the free acid in a spent sulfuric acid pickling liquor containing ferrous sulfate involved a cooling of the liquor in order to precipitate ferrous sulfate heptahydrate ($FeSO_4.7H_2O$) which is considerably more bulky than monohydrade ($FeSO_4.1H_2O$). The cooling may be accomplished by contacting the liquor with ambient air, refrigeration, or vacuum evaporation. Whichever method is used, little evaporation of water takes place, and consequently the remaining supernatant acid will still contain appreciable amounts of ferrous sulfate. Further, the recovered sulfuric acid will be of relatively low concentration. The cooling process is more difficult to carry out during warm weather, the heat transfer surfaces can become badly scaled with the ferrous sulfate heptahydrate, and the recovered salt, being the heptahydrate, is almost half combined water, thereby increasing the difficulty and cost of disposal.

Two other processes are known to have found very limited commercialization using a monohydrate process. One process involving a spray drying tower similar to that disclosed in U.S. Pat. No. 2,327,039 requiring major capital investment, large space required for the installation, must be fabricated from acid and heat resistant materials, and has major scale build-up from evaporative drying therewithin with resultant down time, clean up and maintenance costs. The other, a submerged combustion process had lower capital requirements, but has extreme down time and maintenance for clean up of scale, and air pollution problems which do not meet today's standards.

It is therefore apparent that an improved method for disposing of spent sulfuric acid pickling liquor while recovering unspent sulfuric acid from the pickling liquor has long been needed. The recovered metal salts are a useful by-product or may be much more conveniently disposed of. It has been recognized that separation of the ferrous sulfate as the monohydrate ($FeSO_4.H_2O$) would have advantages, particularly if it could be precipitated from hot solutions subjected to evaporative concentration. However, no method or apparatus has heretofore been developed which could economically carry out such processing. Since any such evaporative system would be operating with saturated solutions of ferrous sulfate, and other metal sulfates such as zinc sulfate, it would be expected to scale badly, reducing the heat exchange efficiency and interfering with the operation of the process. Further, the processing of hot aqueous sulfuric acid would be expected to create severe corrosion problems not only in the evaporator, but also in other portions of the system, such as in the filter or other liquid solid separator. In the development of the present invention, it has been found that all of these problems can be successfully overcome, and that the evaporative concentration and recovery of free acid in the spent pickling liquor and separation of the metal salts becomes not only practical but highly efficient by employing a unique direct heat exchange evaporator unit, as will subsequently be described in detail herein.

The apparatus and method features of this evaporator make possible its use as part of a continuous method and system for processing of spent pickling liquors. This continuous method and system will also be described and should be understood as comprising part of the present invention. However, it is recognized that the evaporator unit, method, and system, of this invention can be applied to other similar processing operations, that is, that they are not limited to use in processing spent pickling liquors.

Speaking generally, the evaporator unit can be employed for precipitation of solids from water solutions thereof, whatever the intended purpose, whether the recovery of the solids, the restoration of the solution, or both. While the evaporator unit has particular advantage for the evaporative precipitation of metal salts exhibiting reverse solubility characteristics of the solutions, the evaporator unit, as well as the method and system, can also be employed for the precipitation of other dissolved metal salts, or inorganic or organic compounds which are non-flammable, heat stable and have normal as opposed to reverse solubility characteristics at elevated temperatures of the solutions. The evaporator unit, method, and system may also be employed for concentration of aqueous solutions without necessarily precipitating solids from the solutions, or for the concentrations of slurries containing suspended particles which are not appreciably soluble in water. In general, therefore, the present invention is applicable to the processing of aqueous solutions and slurries for either concentration of the solution, precipitation and removal of solids therefrom, or both.

Aqueous inorganic acid solutions contaminated with metal salts, such as ferrous sulfate or ferrous chloride, result from other industrial processes. For example, spent aqueous sulfuric acid containing ferrous sulfate as a contaminant is an unwanted byproduct from the production of titanium dioxide. It will be apparent therefore that such aqueous sulfuric acid solutions can be processed according to the present invention to recover the sulfuric acid and provide a means for disposing of the contaminating salts as concentrated solids. Further, waste water from many industrial processes may be contaminated with inorganic salts which would be desirably removed before disposal of the water. For example, waste water containing sodium sulfate is produced from the processing of synthetic sausage casings. The present invention would permit the waste water to be processed for separation of substantially all of the sodium sulfate. Similarly, aqueous solutions of sodium sulfate which might desirably be processed in this way result from the industrial production of sodium sulfate itself. Still another potential application of this invention is to the processing of waste water from metal finishing or metal refining operations which waste waters will contain various metal salts. These illustrations are not set out with a view to listing all possible applications of the evaporator unit, method, and system of this invention, but rather to indicate the broad scope of its potential application.

The present invention provides a compact, relatively low cost, high efficiency evaporator unit which can be operated with such difficult feed liquors as aqueous inorganic acids, or other liquors of comparable corrosiveness, and also on feed liquors containing dissolved solids subject to scaling, particularly reverse solubility inorganic metal salts, such as ferrous sulfate, zinc sulfate, sodium sulfate, calcium sulfate, manganese sulfate, magnesium sulfate, etc. Further, as already indicated, the evaporator unit can be integrated into a continuous system and method whereby the precipitated solids can be recovered in a concentrated form and, if desired, a solution concentrate can be produced of low dissolved solids content.

THE DRAWINGS

The evaporator unit, system, and method of this invention is illustrated in certain preferred embodiments in the accompanying drawings, wherein —

DETAILED DESCRIPTION

Figures 1, 2, 2A, 2B:
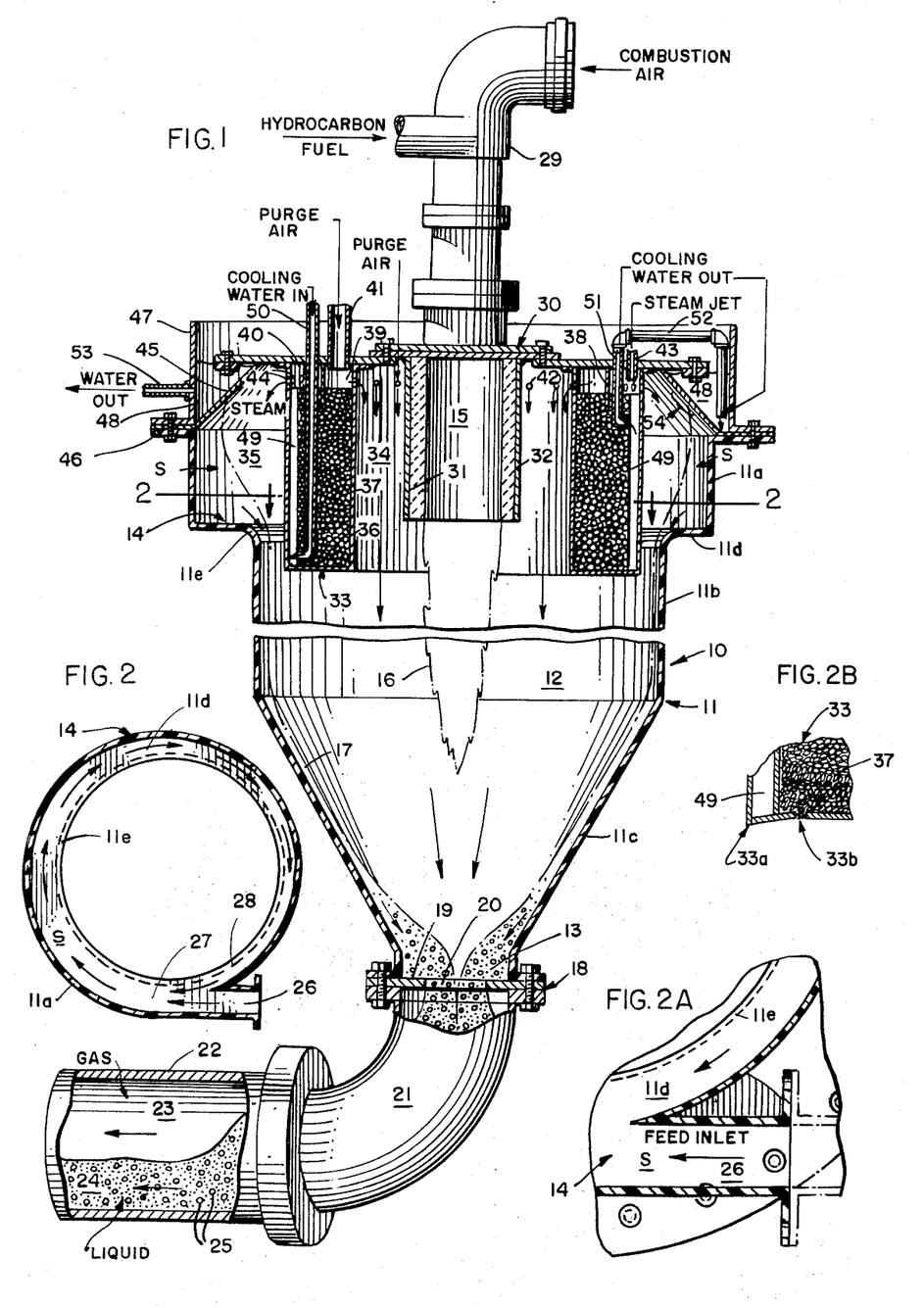
FIG. 1 is an elevational view, partly in section showing an evaporator unit constructed in accordance with the principles of the present invention.
FIG. 2 is a reduced scale plan view, partly in section, being taken on line 2—2 of FIG. 1, and showing the feed inlet and distribution means of the evaporator unit.
FIG. 2A is a fragmentary enlarged view of the feed inlet as shown in FIG. 2.
FIG. 2B is an enlarged fragmentary section view showing a modification of the water-cooled baffle of FIG. 1.

Looking first at FIG. 1, there is shown a direct fired wet-wall evaporator unit of unique construction. The evaporator unit designated generally by the number 10 includes vertically extending wall means 11 enclosing an evaporator chamber 12. The lower portion of the chamber provides an outlet 13. As designated generally by the number 14, and shown more clearly in FIGS. 2 and 2A, a feed inlet and distribution means is provided in the upper portion of chamber 12 in association with the upper portion 11a of the chamber enclosing wall 11. A burner means designated generally by the number 15 is centrally located in the upper portion of chamber 12 and produces an open flame indicated at 16 which jets downwardly within chamber 12. As will be noted, the flame 16 is spaced from the wall 11 which will be wet with the solution to be evaporated, but is in direct heat exchange relation therewith, so that the solution on the walls will be subjected to radiant heating and flows downwardly over the interior wall surfaces. In the illustration given, this downwardly flowing liquid is indicated at 17, and, as will be noted, the liquid exits through the bottom outlet 13. At the same time, the hot combustion gases produced by flame 16 exit through bottom outlet 13.

In association with outlet 13, liquid-gas intermixing means designated generally by the number 18 is disposed across the path of flow by the exiting liquid and hot gases for producing a turbulent intermixture thereof. Advantageously, the lower wall portion 11c may converge to outlet 13, being of frustoconical configuration, and the intermixing means 18 may be in the form of a venturi or orifice plate 19 providing a mixing orifice 20 through which the exiting liquid and hot gases flow. As shown, plate 19 may be made removable so that alternate plates can be used providing different sizes for the orifice 20, thereby controling the rate of flow, pressure differential in the system and the turbulent intermixing. With the construction shown, the liquid in the lower portion of chamber 12 can be maintained in the form of a swirling vortex for rapid and thorough intermixture of the combustion gases as the liquid-gas mixture flows through the orifice 20 into the pipe elbow 21 which connects to the transfer pipe 22. Within the short length of the elbow section 21, substantially all of the sensible heat of the combustion gases can be rapidly transferred to the liquid with resultant rapid evaporation and quenching of the hot gases without localized overheating and resultant thermal decomposition of the liquid or solids therewithin. Thus, evaporation of water from the solution occurs by direct radiant heating in chamber 12, while a further large amount of evaporation occurs by virtue of the turbulent intermixing of the combustion gases and liquid as they exit from chamber 12. The cooled combustion gases and water vapor separate rapidly from the solution. In the connector pipe 22 the gas 23 will collect in the upper portion of the pipe while the liquid 24 will collect in the lower portion thereof.

As indicated, the liquid may contain suspended solids 25 which have been precipitated from the solution by the evaporation of water. The forced turbulent intermixing of the liquid and gas provides for highly efficient and complete sensible heat transfer with maximum water evaporation. In fact, with this arrangement, water can be evaporated at a high rate, substantially below its normal boiling point due to the large degree of entrainment of the liquid in the gas stream (combustion gas and air). The gas stream reaches equilibrium with respect to water vapor as the gas stream and liquid intimately contact and intermix. The transfer of sensible heat, which cools the gases to a temperature near that of the liquid, also evaporates a corresponding amount of water at a high evaporation rate. The resulting separated gas will therefore be substantially in equilibrium with the liquid.

While a vortex creating venturi means, such as the frusto conical lower portion 11c of the chamber and orifice plate 19, is the preferred liquid-gas intermixing means, it will be understood that other liquid-gas intermixing means can be employed. For example, a stream of combustion gas may be directed into a pool of the liquid to produce a violent srubbing and intermixing action, and the resulting liquid-gas mixture passed through an outlet to a separator. A further alternative is to pass the exiting liquid and hot gases through a tubular mixer containing mixing baffles or packing (if all surfaces are continuously wetted) and after the transfer of sensible heat has been completed, passing the liquid gas mixture through a separator. Also the geometry of the outlet 13 may be arranged and sized so that the plate 19 may be dispensed with.

The feed inlet and distrubution means 14 will now be described in greater detail. Advantageously, as shown, the evaporator chamber wall means 11 may include an upper portion 11a being of larger diameter than the intermediate portion 11b and being connected thereto by an inwardly extending ledge or shelf portion 11d. As shown more clearly in FIG. 2, ledge portion 11d is a generally annular configuration. The liquid feed may be introduced through an inlet 26 for distributing flow around shelf portion 11d, as indicated by the arrows in FIG. 2. Preferably, as shown, shelf portion 11d progressively narrows in width from the point of the feed introduction in the direction in which the feed is distributed therearound. In other words, while shelf portion 11d is continuous, that is, forms a connected annular shelf, its widest portions may be adjacent the inlet 26, as indicated at 27 just downstream of the inlet, and its narrowest portion, as indicated at 28, immediately adjacent to the junction at the inlet. The orifice of the inlet is preferably rectangular for smooth entry to shelf portion 27. To provide for the smooth flow of the incoming feed from shelf portion 11d onto the annular downwardly-extending wall 11b, ledge portion 11d may be provided with a smoothly rounded inner corner 11e providing a smooth junction between the inwardly extending surface of the ledge and the downwardly extending surface of the intermediate chamber wall 11b. In order to protect the chamber wall portions 11b, 11c, from being subjected to the high temperatures of flame 16 and/or the hot combustion gases, it is important to have the downwardly flowing liquid 17 completely covering the inner surfaces of the chamber walls. With the feed inlet and distribution just described, this can readily be accomplished, which thereby makes it possible to utilize inexpensive corrosion-resistant materials for forming the chamber walls, such as plastic resin materials, which would not otherwise be usable. While the single inlet construction has been found suitable for relatively small size chamber construction (of below approximately 3.5 million BTU/hr. burner 15 and approximately 36 inch diameter size) multi inlets are contemplated for larger diameters so as to provide sufficient flow of feed to adequately cover the increased wall area using similar design consideration.

With the construction shown, the portion of the evaporator chamber wall below the feed inlet and distribution means 14 may be formed of a plastic resin material. Advantageously, the feed inlet and distribution means 14 may also be formed of the same plastic resin material, as indicated by the cross-sectional shading in FIG. 1 with respect to the funnel-shaped chamber wall providing means 11. A wide variety of plastic resin materials can be used, since by maintaining the water solution over the entire inner wall surfaces of the chamber, the chamber wall will not be subjected to temperatures above the boiling temperatures of the solution. A fiberglass reinforced polyester resin is an example of a suitable material of construction, but other acid resistant plastic or plastic resins can be used, such as teflon, polypropylene, etc., and such resins may be reinforced with glass fibers, ceramic fibers, etc. Also other materials, albeit more expensive, such as graphitic materials, ceramics, glass, glass lined steel, zirconiums, or tantalums etc. may be used.

As shown, the burner unit 15, is designed for operation with natural gas or other hydrocarbon gas fuel, but it will be understood that the burner may be modified to utilize a hydrocarbon oil fuel. As shown, the pressurized gas fuel and primary combustion air are metered and mixed in a burner supply tube 29 which communicates through a top plate assembly 30 to the interior of a ceramic or refractory burner tube 31 which extends downwardly within the upper portion of chamber 12 in inwardly spaced relation from the feed inlet and distribution means 14. As shown, the flame jet producing burner 15 is centered in relation to upper chamber portion 11a. The outside of the burner is provided with a metal sheath 32 which encloses and is bonded to the ceramic tube 31. The burner tube 15 is thus suspended from plate assembly 30 and is removable therewith when the upper plate is disassembled.

To protect the inlet and distribution means 14 from the radiation of heat created by the burner means 15 and flame 16 a baffle wall means designated generally as 33 is disposed about the burner 15. In the illustration given, baffle wall 33 is of annular configuration, and is positioned at an intermediate location between the feed inlet and distribution means 14 and the burner means 15, thereby providing inner and outer downwardly opening passages or annular spaces, respectively, designated by the numbers 34 and 35. Advantageously, as shown, baffle wall 33 extends downwardly at least to the level, and preferably below the level of the feed inlet and distribution means 14, extending for a short distance into the space surrounded by the upper end of intermediate wall portion 11b. An annular drip lip or edge may be employed at the lower outer corner of the baffle by extending the outer wall slightly downwardly. Alternatively, as shown in FIG. 2B, a drip edge or corner 33a may be formed. Preferably, the bottom of the baffle wall has a slight gap at 33b filled with adhesive insulation so as to minimize conductive heat transfer to the outer walls of the baffle. The baffle wall means 33 also serves as a physical barrier to prevent splatters or splashes or large droplets that might be generated in the feed inlet and distribution area engaging the sheath 32 of the burner means and causing scale build up thereon, and prevent these large droplets from impinging on the flame with the resultant decomposition thereof. Also the baffle means affords the use of relatively low value input of purge air as will be later described because the geometry thereof channels the purge air for efficient use thereof. Baffle wall 33 is further designed to serve as a heat shield reducing the transfer of heat by radiation and/or by convection. For this purpose, the hollow tubular metal casing 36 which forms the outside of the baffle wall, as shown, may be bondingly filled with a granular refractory or ceramic material or other high temperature insulation as indicated at 37.

With the construction shown, it is desirable to introduce a flow of purging air into the upper portion of annular space 34 for downward flow over the outer surfaces of the burner 15 and the inner surfaces of the baffle 33. The purge air as a percentage of combustion air with the assembly shown is in the range of 10 to 40% purge air with approximately 20% being typical. This air flow serves to sweep and cool these surfaces, provides secondary combustion air, and also serves to reduce the overall operating temperature in the system, which gives greater tolerances for materials of construction of the chamber 11. The cooling of the baffle surfaces by the air flow assists in reducing the transfer of heat from the burner through the baffle wall 33 to the outer annular space 35 and the feed inlet and distribution means 14. The downward movement of the airflow assists in preventing any fine droplets or aerosol mist of the solution being evaporated from entering the space 34 and building up a deposit of solids on the inside of the baffle wall or the outside of the burner tube. With the construction shown, as already indicated, these surfaces are continuously swept by the air flow.

The downwardly flowing annulus of air generated within the space 34 in conjunction with the physical barrier of the baffle means 33 serves to prevent migration of and shield the flame 16 from direct contact with much of the very fine droplets or aerosol mist of the solution being evaporated. The instantaneous drying of such droplets or fine mist by contact with the flame can produce extremely fine solids which can interfere with separation of the precipitated solids from the solution, such as by filtration and produce thermal decomposition thereof. For example, sulfate metal salts, such as ferrous sulfate or zinc sulfate, may be calcined to their corresponding oxides with the formation of sulphur trioxide or sulphur dioxide gases. As will be appreciated, it is desirable to avoid the formation of such contaminating gases, which will be difficult to remove from the exhaust gases produced by the evaporator.

Although the means for introducing the purging air into the upper portion of space 34 is not critical, one convenient means is illustrated in FIG. 1. As shown, the packing or insulation material such as spun glass wool of magnesium glass 37 terminates at a distance from the top wall 30 of the evaporator to provide an annular space which is divided by a partition ring 38 into an inner annular space 39 and an outer annular space 40. An air supply pocket 41 communicates with inner space 39 through top plate assembly 30 for supplying compressed air, as supplied, for example, from a centrifugal blower, through the annular space 39 for distribution therearound and exit through the circumferentially extending perforations 42, which communicate to the upper portion of space 34 for admitting the flow of purging air thereto.

To prevent solids deposition and scale buildup on the wall surfaces surrounding annular space 35, that is, the wall surfaces adjacent the feed inlet and distribution means 14, it has been found desirable to introduce water vapor into the upper portion of space 35 for the purpose of maintaining a high humidity atmosphere therein. Advantageously, the water vapor may be introduced in the form of steam, which may be substantially saturated steam. For example, as shown, a steam jet 43 can extend through the top plate assembly 30 into the outer annular space 40 of the baffle wall 33. The outer wall of baffle 33 is provided near the top thereof with circumferentially extending perforations 44 which provide communication between annular space 30 and the upper portion of space 35. In this way, a flow of substantially saturated steam can be continuously admitted into space 35 to maintain a high humidity atmosphere therein. If desired, however, the water vapor, such as water vapor in the form of steam, could be admitted directly to the upper portion of space 35 through the top plate assembly 30, or other means can be provided for maintaining a high humidity atmosphere, such as the introduction of air saturated with water vapor, the provision of water sprays in the upper portion of space 35, etc.

The provision of the high humidity atmosphere within annular space 35 will tend to cause water vapor to condense on the walls thereof. For example, the portion of top plate 30 forming the top wall for space 35 will provide a water condensing surface, since it will be cooled by contact on its outside with the ambient atmosphere. To promote such condensation on the other wall surfaces, however, it has been found desirable to provide at least part of the surfaces of the baffle wall and chamber wall in contact with the high humidity atmosphere with cooling means to assure a more positive condensation of the water vapor thereon. More specifically, it has been found desirable to utilize such cooling means in conjunction with the portion of the chamber wall immediately above the feed inlet and distribution means, and also in conjunction with the portion of the baffle wall directly opposite the feed means. These surfaces can therefore be made into water condensing surfaces, so that water will continuously condense thereon, maintaining a liquid film on these surfaces, and continuously washing them to preclude the build up of solids and scale formation on these walls.

While various means can be employed for cooling the wall surfaces for the purposes just described, one convenient arrangement is illustrated in FIG. 1. As shown, there is provided immediately above cylindrical wall 11*a*, an inwardly and upwardly inclined wall 45, which, as shown, may be of frusto-conical configuration. The lower end of wall 45 may be supported as indicated at 46, and its upper end positioned in abutting relation with the underside of top plate assembly 30. Also mounted at 46 is an upwardly extending cylindrical wall 47 which together with inclined wall 45 forms an annular cooling water trough 48. By circulating cooling water within trough 48, wall 45 is cooled by indirect heat exchange, and the water vapor steam is caused to condense on the inner surface thereof.

Cooling the outer wall of the baffle 35, a cylindrical cooling chamber 49 may be provided within the baffle wall in heat exchanger contact with the outer metal wall thereof, which adjoins the space 35 and faces the feed inlet and distribution means 14. As shown, a conduit 50 may extend through the granular refractory packing to communicate with the annular space 49 for introducing cooling water therein and another conduit 51 may be arranged on the other side of the baffle for communication with the annular space 49 for removal of cooling water therefrom. To provide for more efficient use of the cooling water, the conduit 51 may be extended by a pipe connection 52 to discharge into the trough 48. The cooling water, which will be supplied under pump pressure, may thus flow first through the circular cooling chamber 49, and then through the annular trough 48 before being discharged through outlet pipe 53 on the other side of the trough. The exited cooling water may be conveniently then piped to the filter means for use to be described. It will be understood, however, that neither the particular cooling water flow, nor the arrangement of the cooling means themselves, are critical for accomplishing the desired result of maintaining water condensing surfaces on at least the lower portion of the outer wall of the baffle 33 and the upper portion of the outer chamber wall, as described with respect to wall member 45.

Preferably, as indicated, the incoming feed rises to a level on the outer wall adjoining the inlet. By introducing the feed under pump pressure through an inlet arranged essentially tangentially to the wall 11a, as shown more clearly in FIG. 2, the incoming stream of liquid may be caused to flow around the shelf lid under centrifugal force. It will therefore rise upwardly, as indicated by centrifugal action. Advantageously, as shown, the normal upper level of the surface of the incoming stream, indicated by the letter S, should be on or adjacent to a cooled water vapor condensing surface, such as the inner surface of wall 45. Since the space 39 is not desirably maintained completely full of the incoming liquid, and the incoming liquid is normally maintained at an outwardly-spaced distance from the outside of baffle 33, there will inevitably be a wet-dry transition zone in the upper portion of space 35 along the outer wall thereof. In the illustration given, this zone is indicated by the bracket designated by the number 54. It will be understood that the exact boundry of the top of stream S will fluctuate under the action of the pump pressure and centrifugal force. However, it has been found practical to maintain the surface of the liquid stream in contact with the upper wall member 45, for example, within the wet-dry transition zone 54. Although the stream S will be in direct contact and will wash only that portion of the wall below the wet-dry transition zone on a continuous basis, the normally dry portion of the wall thereabove will nevertheless be maintained as a wet wall because of the continuous condensation of water vapor thereon. Further, by having the cooling of the wall 45 extend through and below the wet-dry transition zone 54, as well as by having the wall portion 11a in contact with the ambient atmosphere, it can be assured that all of the wall surfaces in contact with the incoming feed will be at lower temperatures than the feed, thereby eliminating any tendency for the dissolved solids to precipitate thereon when said solids are metal salts having reverse solubility characteristics. Similarly the lower wall portions 11b, and 11c do not function as heat exchange walls, but rather are in contact with the ambient atmosphere, and normally will be maintained at temperatures below, or at least no higher than the downwardly flowing solution thereon.

The condensing surfaces, such as the outer wall of baffle 33, or the inwardly inclined wall 45, may be formed of corrosion-resistant metals. In systems operating with aqueous inorganic acid feeds, such as aqueous sulfuric acid, zirconium has been found to be particularly suitable as a material of construction for the condensing wall members.

As indicated, the entire inclined wall 45 may be cooled. However, at least the portion thereof bridging the wet-dry zone 54 should be cooled to prevent an abrupt transfer from a liquid wet surface to an evaporating surface on which solids can accumulate by evaporation to dryness of droplets of the incoming liquid.

OPERATING SYSTEM AND METHOD

Looking now at FIG. 3, an evaporator apparatus similar to evaporator 10, as described with reference to FIG. 1, is shown integrated into a processing system, which can be utilized for the recovery of precipitated solids from the solution being evaporated, or for the recovery of a purified liquid concentrate, or both. With reference to the evaporator 10, the components corresponding to those of FIG. 1 have been given the same numbers for convenience of identification. In the illustration given, there are some monor differences. The purging air is shown being introduced directly into the top of the annular space 34 around the burner 15, the cooling water is introduced separately into and removed from the water jacket 49, which extends completely to the top of the baffle wall, steam is introduced directly into the top of the annular space 35, and cooling water is separately introduced into and removed from trough 48. The operation of the evaporator, however, is essentially the same as that described with respect to the more detailed structural representation of FIG. 1.

The incoming stream S of the solution to be evaporated is introduced and distributed by the means 11, as previously described, rising upwardly into contact with the condensing wall 45 and feeding downwardly in a continuous flow onto the vertically extending wall 11b of the wet-wall evaporator. The downwardly flowing liquid 17 is exposed to direct radiation from the flame 16, and forms a vortex in the converging lower portion 11c thereof where it is admixed with the hot combustion gases. The liquid-gas mixture exits through the venturi 19 which produces a turbulent intermixing of the liquid and gas causing substantially complete transfer of the sensible heat from the combustion gases to the liquid for maximum evaporation of water therefrom. The cooled gases separate from the liquid in the upper portion of connecting pipe 22 as indicated at 23 with the concentrated liquid, which will usually contain substantial precipitated solids, collecting in the lower portion thereof, as indicated at 24.

Figures 3, 4, 4A:
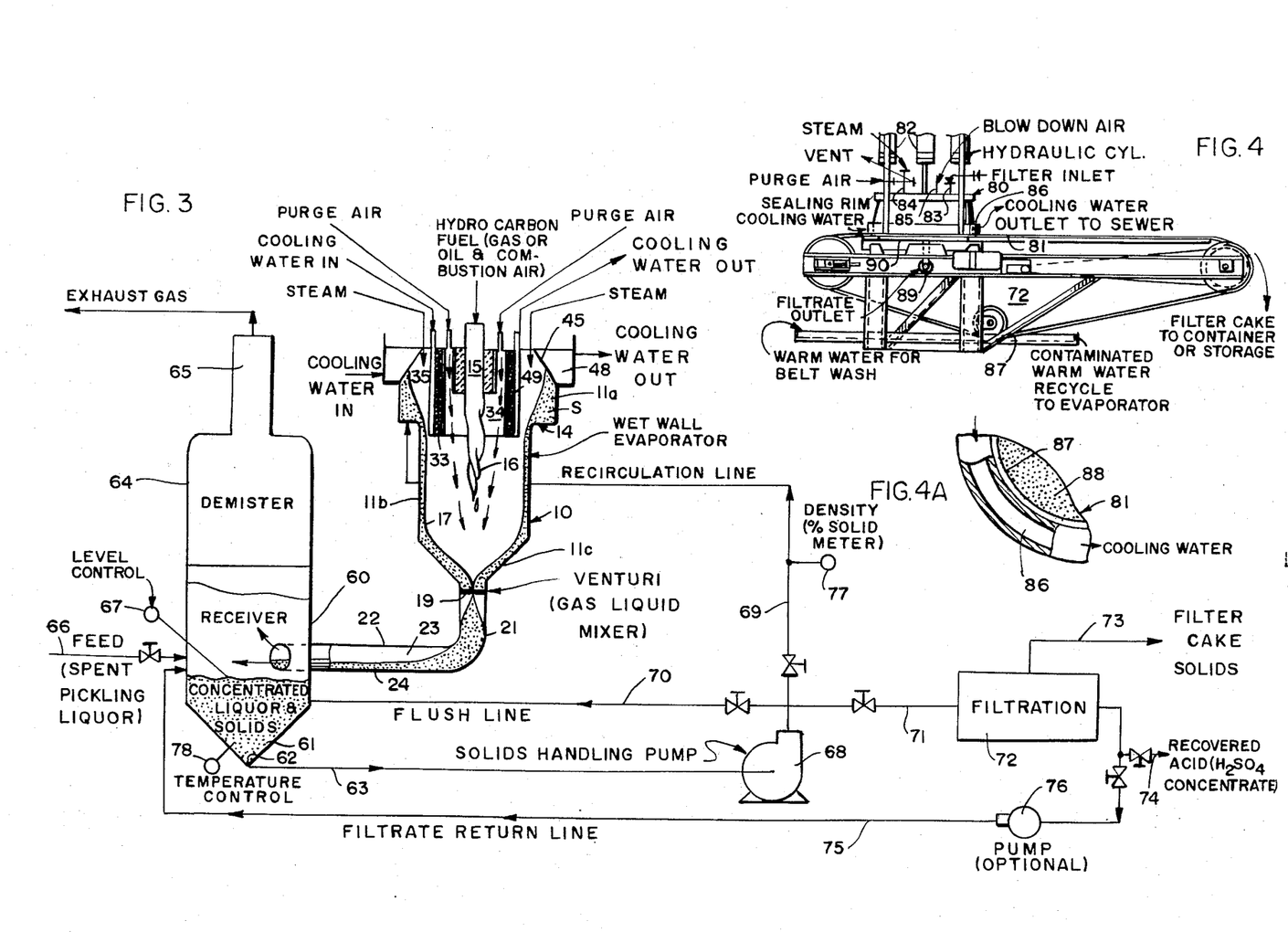
FIG. 3 is a diagrammatic flow sheet illustrating the system and method of this invention utilizing an evaporator unit similar to the one of FIG. 1.
FIG. 4 is an elevational view of a filtration apparatus which can be used in the system and method of FIG. 3 to perform the filtration operation indicated therein.
FIG. 4A is a fragmentary detail plan view, partly in section, showing a portion of the sealing rim of the filter which engages the filtration belt, as will subsequently be explained in greater detail.

As shown in the flow diagram of FIG. 3, the connecting pipe 22 discharges tangentially into a cylindrical receiver 60. The tangential discharge promotes further separation of the gases from the liquid, the liquid falling downwardly into the storage reservoir 61 provided by the lower portion of the receiver 60, which lower portion converges to an outlet at 62 communicating with a circulation line (pipe) 63. Since the gases separated in receiver 60 may contain entrained droplets of liquid or mist they are preferably discharged by passing them upwardly through a demister unit 64, which may be in the form of a column packed with fiberglass or ceramic fibers, the liquid collecting on this filtration material, while the gases pass therethrough for exhausting to the atmosphere through a stack 65.

The system is preferably operated at 1 to 3 pounds psig chamber pressure in chamber 11 as provided by incoming combustion and purge air pressure and fuel pressure. This provides ample motive force to mix the fuel and primary combustion air; to create the intermixing of the gases and liquid and drive them into the receiver; to demist in the receiver all but a most minor portion of the entrained mist and droplets; and force the gases with the remaining aerosols or fine mist through a high efficiency mist eliminator and exhaust through a suitable stack. Incoming fuel and air pressure is sufficient to drive the system without additional boosters. Because of the overall compactness of the system, (burner chamber, receiver, and demister unit) the relative strength of the materials of construction do not need to be great and therefor, easy to fabricate economically. For example, the burner chamber walls need only be approximately one-fourth of an inch in thickness and 24 inches in diameter for a 1.5 million B.T.U./hr. burner.

As indicated, the liquid feed, comprising the solution to be evaporated, may be conveniently supplied to receiver 60 through a valve-equipped line 66. The valve on line 66 may be connected to a level control 67 arranged to automatically open the valve when the level of liquid within receiver 60 falls to a certain minimum level.

In the operation of the system and method, the concentrated liquor in receiver 61, which will usually contain suspended solids, is withdrawn through the line 63 and recirculated by means of a solids handling pump 68 through a recirculation line 69 connected to the inlet to evaporator 10, as indicated on FIG. 3. To maintain continuous flow through the exit line from pump 68 and to provide for continuous agitation of the concentrated liquor within receiver 61, thereby maintaining a more uniform suspension of the solids therein, a flush line 70 can also be connected to the discharge from pump 68.

With the arrangement described, the system can be operated on a batch basis, the recirculation of the slurry, comprising the liquid to be concentrated with the precipitated solids therein, being continued until the liquor has been concentrated to the desired level with the solids being built up therein to a desired concentration for removal. At that point, if desired, the burner can be shut down, and the entire contents of the receiver 61 can be processed to separate the solids from the liquid, using any suitable solids separating procedure, such as filtration, or centrifugation. For this purpose, the valves on the flush line 69, 70 may be closed, and the valve on the filtration line 71 opened. The pump 68 will then supply the slurry to a solids separating unit, such as the filtration unit indicated at 72. From this filtration, a filter cake comprising the recovered solids may be removed as indicated at 73, and the filtrate, either recovered through a valve controlled line 74, or partially or completely recirculated through a valve control line 75 to receiver 60. If desired, an additional pump 76 and pump tank not shown may be provided on line 75.

For continuous or semi-continuous operation, it has been found desirable, after the solids in the slurry have built-up to a certain predetermined level, to recirculate only part of the slurry removed from receiver 60, and concurrently to pass the other part of the slurry to the filtration unit 72 through the line 71. In other words, the valve on line 71 will be open while the valves on lines 69 and 70 also remain open. As indicated, this may be automatically accomplished by means of a density meter 77, which senses the per cent solids in the recirculated slurry, and on the achieving of a predetermined level of solids, opens the valve on the line 71 to the filtration unit. At this stage of the operation, the solids can be removed by filtration at 72, and all of the filtrate recirculated through the receiver through line 75. Later, where a desired concentration of the filtrate has been achieved, such as in the recovery of sulphuric acid from a pickling liquor, the valve to the recirculation line can automatically be closed, and the valve on the acid recovery line 74 opened. For example, this can be accomplished by a temperature control, as indicated at 78, which is arranged to sense the temperature of the liquid in receiver 60. As the concentration of the acid solution increases, its temperature will correspondingly increase, since its boiling temperature will be higher, and therefore the controls on the valves of lines 75 and 74 can be made to operate for the recovery of acid of a predetermined concentration.

In the operation of the system and method as just described, it will be apparent that the evaporation of water through the radiant and sensible heating of evaporator 10 will continuously reduce the volume of the slurry circulated to the evaporator. Additional feed liquor will be intermittantly introduced to receiver 60 to make up the liquid loss by virtue of the operation of the level control 67. This level control will also admit a larger increment of feed, when the stage is reached where the valve on the filtrate return line closes, and the filtrate is diverted to recovery of concentrated acid through line 74. In practice, the total volume of slurry maintained in receiver 60 can be such that even the largest increments of added feed are a small fraction of the total volume, such as 5 to 10% of the total volume, thereby avoiding any large temperature swings in the slurry being recirculated to evaporator 10.

The method and apparatus just described can be utilized for the processing of spent aqueous sulphuric acid pickling liquor to separate the ferrous sulfate and other metal salts and recover a concentrated acid reusable in the pickling operation. The spent pickling liquor which will comprise dilute aqueous sulphuric acid contaminated with high concentrations of ferrous sulfate and other metal salts, such as zinc sulfate, can be processed in three phases. In the first phase, all of the slurry will be recirculated from the receiver 60 to the evaporator 10 with increments of feed being added only sufficient to make up for the evaporated water. As this recycle operation continues, the concentration of solids in the slurry will gradually increase. At a predetermined solids concentration within the range of 5 to 40% solids by weight, a portion of the slurry can be diverted to filtration. This will comprise the start of the second phase of operation. For example, when the solids have built up to 15 to 35%, such as a 20% solids control level, a small percent of the recirculated slurry, say 5 to 15%, is diverted to filtration, while the remaining portion of the slurry continues to be recirculated to the evaporator. In this second phase, the ferrous sulfate monohydrate crystals together with any other metal sulfate solids are separated and recovered as filter cake solids. The filtrate which may have an acid concentration in the range of 10 to 30% by weight, is all recirculated through the receiver. As this second phase progresses, the concentration of sulfuric acid in the filtrate will gradually increase to a level at which it is desirable to recover the filtrate for reuse in the pickling operation. For example, at acid concentrations of 35 to 45% by weight, the filtrate may be diverted to recovery, and no filtrate recirculates to the receiver, the decrease in liquid volume in the receiver being made up by the automatic introduction of additional fresh feed (spent pickling liquor). Following the removal of the recovered filtrate from the system, comprising the concentrated acid solution of relatively low salt concentration, the system may return to either Phase 1 or Phase 2. If the residual solids concentration of the slurry is above the preset level for filtration, the filtration of a portion of the recirculated slurry will continue for the filtrate being returned to the receiver. Should the solids concentration in the receiver be below the level for the filtration cycle, all of the slurry from the receiver will be recirculated to the evaporator until the solids concentration is again built up, the operation will again pass through Phase 2 and enter Phase 3 for recovery of the sulfuric acid concentrate.

At the beginning of Phase 1, the temperature of the slurry in the receiver may be in the range of about 182°–192° F. During Phase 1 and through Phase 2, this temperature will gradually increase, as the concentration of sulfuric acid increases, the boiling point of the solution increasing in proportion to the concentration of sulfuric acid. Consequently, the acid can be recovered in relation to the temperature of the slurry, for example, when the slurry in the receiver reaches a temperature of 210° to 215° F., the recirculation of the filtrate can be discontinued, and an acid of the desired concentration, such as 35 to 45% sulfuric acid can be recovered.

It will be understood that the system may be provided with suitable safety controls, such as a control automatically shutting off the burner and evaporator if the circulation of liquid thereto is discontinued, or should the concentration of solids in the recirculated slurry go over a certain maximum concentration, the operation of the burner can also temporarily be shut off. In general, the entire system can be automated and instrumented for continuous operation with a minimum of operator attention and supervision.

FILTRATION EXAMPLE

For continuous or semi-continuous operation of the system and methods, as described above, the filtration unit 72 may advantageously comprise an apparatus as illustrated in FIG. 4. This unit is adapted for cycling filtration operation, the filter chamber within which the solids are collected comprising an open bottomed vessel 80 which is mounted for selective engagement with a filter belt 81, and upward movement thereabove by the action of hydraulic cylinders 82. The slurry to be filtered enters the top of the vessel 80 through connection 83 and a multiple connection inlet 84 provides selectively for the introduction of purge air, the venting of gas, and the introduction of steam, as indicated by the descriptive labels. In addition, there is an inlet 85 through which blow down air can be admitted. At the lower end of vessel 80 there is provided a parametric, hollow, outwardly extending rim 86, which in filtration position bears against the parametric gasket portion 87 surrounding the filter mat 88, which are supported at one location within the 360° belt 81. As shown in FIG. 4a, the rim 86 is forced down against the gasket portion 87 of the belt 81 to form a seal therewith, and the solution is forced through the mat portion 88 with a build up of solids thereon within the vessel 80. The rim portion 86, as indicated, is hollow, so that cooling water can be circulated therein as indicated by the labels in FIG. 4 and the arrows in FIG. 4a. The cooling water need only be supplied to the hollow rim 86 during the discharge cycle of the filter, as will subsequently be described.

More specifically, after the vessel 86 has become filled with the separated solids, such as ferrous sulfate monohydrate, or a mixture thereof with zinc sulfate, the introduction of the slurry is discontinued through the inlet 83, and blow down air, comprising compressed air, is introduced through the inlet 85 for the purpose of driving the rest of the liquid through the filter cake, as completely as possible. The admission of compressed air through the inlet 85 can be continued for the purpose of further drying the filter cake. At the conclusion of the drying cycle, the vessel 80 will be vented to atmosphere and will be elevated by means of the hydraulic cylinders 82, which operate pistons connected to the top of the vessel, and simultaneously purge air, comprising compressed air will be introduced through the inlet 84. The purge air precludes the filter cake from riding up with the filter chamber, keeping the filtered solids on the belt 81. As soon as the vessel 81 is raised, the motor operating the belt 81 is started, and the filter cake is discharged off of the end of the belt to a container or storage. The return run of the belt passes downwardly through a washing pan 87, which may contain warm water to facilitate the washing. A convenient source of such warm water is the heat exchange water which has been utilized for water cooling the condensing surfaces at the top of the burner.

For more completely automatic operation of the filtration unit, other operating procedures can be utilized. For example, on the discontinuance of the admission of the blow down and drying air through inlet 85, inlet 84 can be opened to the atmosphere to vent any gas pressure remaining within chamber 80. Thus, the elevation of the vessel 80 above the filtration belt can occur without residual pressure within the chamber, while at the same time a controlled amount of purge air is introduced to assure that the filter cake solids do not rise with the vessel 80 as previously described. As the sealing surface of the vessel 80 is separated from the gasket 87, even though the filter cake is relatively dry, it is difficult to avoid having some saturated solution not adhere to the underside of the rim. During the elevation of the vessel, especially over a series of filtration cycles, this solution can dry on the underside of the rim, leading to the accumulation of solids thereon. Such accumulation of solids on the underside of the rim can interfere with a tight seal between the rim 86 and the gasket 87, or the gasket itself may be distorted or damaged by virtue of the sealing pressure exerted through the cylinders 82. It has therefore been found desirable to discontinue the introduction of purge air through the inlet 84 after the filter cake has been discharged from the vessel 80 onto the belt 81, and instead to admit saturated steam through the inlet 84. At the same time, cooling water is circulated through the parametric rim 86. The steam will flow downwardly out of the bottom of the vessel and sweep around the underside of the sealing rim. Because of the cooling of the rim, the steam will condense thereon, and the condensate will tend to wash the rim surface for the removal of any solids thereon, and will serve to prevent saturated solution from drying on the sealing rim for the accumulation of solids.

From what has been previously said, it will be understood that the filtrate from the filtration unit 72, is removed through filtrate outlet 89 from the collection pan 90 underneath the filter belt, may be recirculated to the receiver 60, or diverted to recovered acid, as previously described. The operation of the system with respect to the three operational phases described above, phase 2 would normally involve several filtration cycles with full return of the filtrate to the receiver, while phase 3 would involve filtration cycle with recovery of the concentrated acid.

CONTINUOUS PROCESS EXAMPLE

A continuous process is operated in accordance with the previously described flow sheet of FIG. 3 and the filter of FIG. 4 for recovery of free acid and separation of the metal salts of aqueous sulfuric acid pickling liquor. In the typical spent pickling acid application, the spent acid is available in discrete batches, i.e. 5,000 to 30,000 gallons, commonly 12,000 gallons. In one such application, 12,000 gallon batches of spent pickle acid of composition 1–20% by weight $H_2SO_4$, typically around 5%; 0–45% by weight $FeSO_4$, typically around 20%, and the balance water, are processed at an average rate of 1–15 GPM, (other metal sulfate salts may also be present such as $ZnSO_4$.) In this example, the 12,000 gallon batch with typical specific gravity of 1.2 would consist of the following:

| | |
|---|---|
| $H_2SO_4$ | 6,000 pounds (100%) |
| $FeSO_4$ | 24,000 pounds |
| Water | 90,000 pounds |
| | 120,000 pounds total |

The net results of processing such a batch of spent pickle acid would be approximately 31,300 pounds of solids and 10,000 pounds of recovered acid at 40%. The 31,300 pounds of solids would consist approximately of the following composition:

| | |
|---|---|
| 26,800 pounds | Ferrous Sulfate Monohydrate ($FeSO_4 \cdot H_2O$) |
| 2,000 pounds | Sulfuric Acid ($H_2SO_4$) (100%) |
| 2,500 pounds | Water |

The 10,000 pounds of recovered acid at a 40% concentration would consist of approximately 4,000 pounds sulfuric acid ($H_2SO_4$) 100%, 300 pounds Ferrous sulfate ($FeSO_4$) in solution, and 5,700 pounds water. The balance of the 12,000 gallon spent pickling acid fed to the unit is evaporated and leaves the system as water vapor through the mist eliminator. A typical gas analysis during processing of such a batch would be approximately as follows:

| | |
|---|---|
| Water Vapor | 40% by volume |
| Nitrogen | 45% by volume |
| $O_2$ | 5% by volume |
| $CO_2$ | 10% by volume |
| $SO_2$ | 15 ppm by volume |
| $H_2SO_4$ Mist | 0.05 mg/l ACF |

The acid recovery unit can be designed for completely automatic operation. Upon start-up the unit admits spent pickling acid into the receiver tank to a preset level, the burner and recirculating pumps automatically start contingent upon all utilities and safety interlocks being in the prescribed ranges. As the initial feed is heated in the evaporator by the burner flame and combustion gas, a portion of the water is evaporated. Additional spent acid is fed to the receiver by level control in the receiver. As water is evaporated, the concentration of ferrous sulfate and sulfuric acid, which do not evaporate, is increased. After a short time the ferrous sulfate reaches its saturation limit and ferrous sulfate monohydrate begins to precipitate. When the amount of precipitated ferrous sulfate monohydrate reaches a preset level, as sensed by density control (viz. 15-25% solids, typically 20%) the filter is automatically started.

Filtration can be carried out with the filter unit of FIG. 4. The filter operation is cyclic, with each cycle, consisting of five steps, taking approximately 10-15 minutes to be completed. The first step in the filter cycle is the "Fill & Filter" step which is timer controlled and is set at 1-10 minutes, such as 4 minutes. During this step the filter inlet and filtrate recycle valves are open. A portion of the recirculating slurry goes to the filter where the solids are retained on the filter belt, and the clear filtrate is returned to the receiver. After the entire unit has been in operation for several hours the sulfuric acid strength in the receiver will reach the set point, such as 35-45%, typically 40%, as measured by boiling point elevation. At this time the clear filtrate from the filter is transferred to recovered acid storage rather than recycled back to the receiver.

The second step in the filter cycle is the "Blow Heel" step. At the end of the timed first step the filter inlet valve is closed and a high pressure (30–50 psig) air supply valve is opened to the filter. This forces the residual liquid in the filter dome through the filter cake and back to the receiver or recovered acid storage. When all the liquid has been forced through the filter cake, as sensed by a liquid sensor in the filter outlet pipe, the third step is initiated. This step called the "Filter Cake Dry" step is timer controlled, typically set at 3 minutes and is a continuation of the previous step in that the compressed air continues to blow through the filter cake to dry it. Any liquid forced through the filter cake is returned with the air to the receiver. The air is vented to atmosphere through the mist eliminator. When this step times out, the next step, "Filter Vent" is initiated. In this tep the residual compressed air in the filter dome is vented to atmosphere. When the pressure in the filter dome is reduced to essentially atmospheric (i.e. 0.1 psig) the final filter step is started. In this step, "Cake Discharge", the filter dome is automatically raised by the hydraulic system, the filter belt rotates through 360°, dropping the filter cake into the solids receiver, and the filter dome is lowered back into position by the hydraulic system, ready to start the entire cycle again.

Since the filter operates on a fixed cycle, the rate of solids removal is largely a function of the concentration of solids in the recirculating slurry. Both the filter and evaporator components can operate well at slurry concentrations of 5 to 50%, therefore, the unit can readily process spent pickling acid at widely varying concentrations of acid, ferrous sulfate, and/or other metal sulfates.

The 10,000 pounds of recovered sulfuric acid from a typical batch, is normally transferred back into the pickling tank from whence it originated. There, it is added to approximately 8,000 pounds of fresh concentrated sulfuric acid and the tank filled with water. The resultant pickling acid then contains approximately 10% sulfuric acid and 0.25% ferrous sulfate.

It should be noted that the amount of acid adhering and combined in the filter cake is a constant and is a function of the amount of solids removed from the spent pickle liquor. This lost acid is approximately 8% by weight of the ferrous sulfate salts. In steel cleaning operations it is desirable to clean at high acid concentrations, approximately 10%, for maximum speed. With the disclosed recovery system, an earlier dumping of the spent pickle liquor may be had without loss of the free acid so that pickling may continue with fresh make up at the efficient concentrations and recovery of the free acid for later make up use. Traditionally pickling solutions are now operated in the range of 10-12% down to 6% with increasing time being required as acid concentration drops. When it is desired to increase tonnage of pickled metals through a picling tank per unit time, the use of the disclosed recovery system permits the recovery of all the free acid over that constant amount adhering to and combined with ferrous sulfate.

Following a continuous process procedure similar to the one just described, a spent pickling liquor was processed, which initially contained on a weight basis 20% zinc sulfate, 5% sulfuric acid, and 55% water. Average composition of the recovered solids (filter cake) was 392 pounds of $FeSO_4 \cdot H_2O$, 378 pounds $ZnSO_4$, 40 pounds $H_2SO_4$, and 60 pounds $H_2O$ per 870 pounds of filter cake. Approximately 2,000 pounds of feed produced about 870 pounds of such filter cake, and approximately 150 pounds of concentrated sulfuric acid, comprising by weight 40% $H_2SO_4$, 16% $ZnSO_4$, and 5% $FeSO_4$ (on a monohydrate bases) and 39% water. The balance of the water in the feed was removed by evaporation and vented to the atmosphere. As with other applications of the present invention to the processing of sulfuric acid and metal sulfate containing solutions, the mixture of combustion gas and water vapor discharged to the atmosphere should not contain objectionable amounts of sulphur oxide gases, such as $SO_2$ and $SO_3$. In practicing the method of the present invention, it is feasible to maintain the content of sulphur oxide gases in the discharge gases below 20 ppm, which can be expected to comply with federal or state air pollution standards.

In a further embodiment of the present invention where the hydrocarbon fuel available for producing the hot combustion gases is of the kind which will produce a sooty or dirty flame, the evaporator apparatus of FIG. 1 can be modified so that it continues to operate as a direct heat exchange evaporator, but without introducing a flame jet directly into the evaporator. The combustion gases can be formed in an external burner chamber, such as a brick-work furnace, and then passed into the evaporator through a central inlet, such as through the burner tube 15 for forming a downwardly directed jet of combustion gases at temperatures of 1500° to 2000°F. Alternatively, heated gases other than combustion gases can be used. In such modifications, all of the features previously described can be employed, including the admission of purging air to the annular space 34, although the use of purging air in this area will not be as critical as where an open flame jet is employed.

What is claimed is:

1. In a direct heat exchange evaporator for evaporative concentration of water solutions of inverse solubility salts subject to scaling, the combination comprising:
   a. vertically-extending wall means enclosing an evaporator chamber, the lower portion of said chamber having an outlet;
   b. liquid feed inlet and distribution means in the upper portion of said chamber arranged to distribute said solution to be concentrated around the inside surfaces of said wall means to continuously wet said liquid exiting through said chamber outlet;
   c. heated gas supplying means directing a stream of hot gas downwardly into said chamber, said hot gas stream being spaced from said wet wall surfaces while being in direct heat radiation relation therewith, the hot gas also exiting through said chamber outlet;
   d. liquid-gas intermixing means disposed across the path of flow of said exiting liquid and hot gas for producing a turbulent intermixture thereof;
   e. tubular baffle wall means disposed around said hot gas supplying means inwardly of the upper portion of said wall means, said baffle wall means extending downwardly to at least the level of said feed inlet and distribution means while being spaced downwardly therefrom, said baffle wall means acting as a heat shield to prevent heat from being radiated from said hot gas stream directly to said feed inlet and distribution means and the portion of said wall means thereabove;
   f. means for introducing water vapor into the space between said baffle wall means and the said upper portion of said wall means to maintain a high humidity atmosphere therein; and
   g. means for cooling at least part of the surfaces of said baffle means and said chamber wall means in contact with said high humidity atmosphere to cause said water vapor to condense thereon.

2. The apparatus combination of claim 1 wherein said cooling means is effective for cooling said condensing surfaces to a temperature below the said feed solution containing said inverse solubility salt, whereby scale formation on said surfaces is prevented.

3. The apparatus combination of claim 1 wherein said evaporator chamber wall means includes upper and intermediate portions of circular cross-section, the said upper portion being of larger diameter than said intermediate portion and being connected thereto by an inwardly extending ledge portion of generally annular configuration, said liquid feed means being arranged to introduce said feed solution onto said ledge portion for distributing flow therearound.

4. The apparatus combination of claim 3 wherein said liquid feed means is constructed and arranged to introduce said feed solution tangentially to said upper wall portion and under pump pressure to cause said solution to rise upwardly by centrifugal action on said upper wall portion to a level above said ledge, thereby providing a wet-dry interface on said upper wall portion, said upper wall portion upwardly from at least the normal level of contact of said solution therewith and to a level above said wet-dry interface being equipped with cooling means to provide a cool condensing surface bridging said interface and for causing said water vapor to condense thereon.

5. The apparatus combination of claim 4 wherein said water vapor is introduced in the form of substantially saturated steam.

6. The apparatus combination of claim 4 wherein said water vapor is introduced in the form of substantially saturated steam, and wherein at least the portion of said baffle wall means directly opposite said feed means is also provided with said cooling means.

7. The method of operating a direct heat exchange evaporator for precipitation of salts from water solutions thereof, wherein said evaporator is of the kind having a vertically-extending annular wall enclosing an evaporator chamber, the lower portion of which provides an outlet, liquid feed inlet and distribution means in the upper portion of said chamber arranged to distribute the solution to be evaporated around the inside surfaces of said wall to continuously wet said surfaces with downwardly flowing liquid, said liquid exiting through said chamber outlet, combustion gas providing means centrally located in the upper portion of said chamber and directing a stream of hot combustion gas downwardly within said chamber, said stream of hot gas being spaced from the upper portions of said wet wall surfaces while being in direct heat radiation relation therewith, the said hot combustion also exiting through said chamber outlet, an annular baffle wall disposed around said combustion gas providing means and extending downwardly to at least a level of said feed, said baffle wall being spaced inwardly from said feed and the portion thereabove of said chamber wall, comprising the steps of:

a. introducing water vapor into the space between said baffle wall and said portion of said chamber wall above said feed means to maintain a high humidity atmosphere therein; and b. cooling at least part of the surfaces of said baffle wall and said chamber wall in contact with said high humidity atmosphere to cause the water vapor to condense thereon, whereby said surfaces are washed with the condensed water to prevent the build-up of salt thereon.

8. The method of claim 7 in which said salt solution contains sulfuric acid and ferrous sulfate, having been produced by the cleaning of a ferrous metal with aqueous sulfuric acid.

9. The method of claim 7 in which said solution to be evaporated is introduced into said evaporator upper portion under pump pressure and tangentially to said upper wall at the point of introduction, said solution flowing around said upper wall portion and rising upwardly thereon by centrifugal action, thereby providing a wet-dry interface on said upper wall portion, and cooling said upper wall portion at least in an area bridging said wet-dry interface, said cooling being effective to condense water vapor on the exposed portion of said upper wall area and to maintain the liquid contacted portion of said area at a temperature below that of said introduced solution.

10. The method of claim 9 in which said solution is a solution containing an inverse solubility inorganic salt.

11. The method of claim 9 in which said inverse solubility salt is a metal sulfate.

12. The method of claim 9 in which said inverse solubility salt is ferrous sulfate.

13. The method of claim 9 in which said solution is saturated with ferrous sulfate and contains at least 5% by weight of ferrous sulfate solids suspended therein.

14. The method of claim 13 in which said solution has been obtained by cleaning ferrous metals with aqueous sulfuric acid.

15. The method of recovering inverse solubility inorganic salts from water solutions, characterized by the combination of steps comprising:

a. introducing and flowing a water solution of the inverse solubility inorganic salt to be recovered downwardly over the interior wall surfaces of a wet-wall evaporator, said solution being introduced into the upper portion of said evaporator;

b. directing a stream of hot combustion gas downwardly within said evaporator between the wet walls thereof, said hot gas stream radiating heat directly to the flowing solution on said walls for evaporation of water therefrom;

c. thereafter turbulently intermixing said heated solution with said combustion gases to transfer sensible heat from said gases to said solution for further evaporation of water, part of the dissolved inorganic salt being converted to precipitated solids by said evaporations;

d. separating the cooled gases from the residual solution containing said precipitated solids;

e. recycling to said evaporator in admixture with fresh solution at least part of said residual solution containing suspended solids and repeating steps a and d therewith to produce additional precipitated solids; and f. separating at least part of said solids from at least part of said residual solution to obtain recovered solid product of said inorganic salt;

g. maintaining in said upper portion of said evaporator on the walls thereof a circumferentially extending zone having its lower portion in contact with said introduced solution and its upper portion substantially out of contact therewith;

h. introducing water vapor into the upper portion of said evaporator to maintain a high humidity atmosphere therein adjacent said circumferential zone; and i. cooling said circumferential zone to condense said water vapor on said exposed upper portion thereof and to maintain said solution-contacted lower portion at a temperature below that of said introduced solution.

16. The method of claim 15 in which said salt solution contains ferrous sulfate.

17. The method of claim 15 in which said salt solution contains sulfuric acid and ferrous sulfate, having been produced by the cleaning of a ferrous metal with aqueous sulfuric acid.

18. The method of claim 15 in which said solution to be evaporated is introduced into said evaporator upper portion under pump pressure and tangentially to said upper wall at the point of introduction, said solution flowing around said upper wall portion for substantially the full circumference thereof and rising upwardly thereon by centrifugal action to an intermediate level on said circumferential zone.

19. The method of claim 15 in which said water vapor is introduced in the form of substantially saturated steam.

20. A method of concentrating a water solution of solids subject to scale formation in which the said solution is introduced into the upper portion of a wet-wall direct heat evaporator and passed downwardly therein over said wet walls in heat exchange relation with hot gases within said evaporator for evaporation of water from the solution, wherein the improvement comprises:

a. introducing said solution into the upper portion of said evaporator by causing a stream of said solution to flow across an upwardly extending interior wall surface of said evaporator, said stream wetting said wall surface to a level below the top of said wall and providing thereon a horizontally-extending transition zone between the lower part of said surface which is washed by said stream and the upper part thereof which is above said stream;

b. maintaining an atmosphere adjacent said upper part of said wall surface which is substantially saturated with water vapor; and c. cooling said wall surface by indirect heat exchange from the outside thereof at least in an area extending from about said transition zone downwardly thereto and thereby causing said water vapor to condense on the portion of said area above said transition zone for washing said area portion with condensate.

21. The method improvement of claim 20 in which said solution contains a reverse solubility inorganic salt and wherein said improvement further comprises maintaining said cooled wall area at a temperature below the temperature of said introduced solution.

22. The method improvement of claim 21 in which said reverse solubility salt is a metal sulfate having a decreasing solubility in water as the temperatures increase.

23. The method improvement of claim 21 in which said reverse solubility salt is ferrous sulfate.

24. An evaporator for evaporative concentration of water solutions by direct contact of hot gases therewith, including vertically-extending wall means enclosing an evaporator chamber, the lower portion of said chamber having an outlet; liquid feed inlet and distributor means in the upper portion of said chamber arranged to distribute the feed solution to be concentrated around the inside surfaces of the upper portion of said wall means to continuously wet said surfaces below said feed inlet and distributor means with downwardly flowing liquid, said liquid exiting through said chamber outlet; heated gas supply means directing a stream of hot gas downwardly into said chamber, said hot gas stream being spaced inwardly from said vertically-extending wet wall surfaces but exiting through said chamber outlet with said liquid; and liquid-gas contacting means disposed across the path of flow of said exiting liquid and hot gases for producing a heat-exchanging intermixture thereof; wherein the improvement comprises: burner means centrally located in the upper portion of said chamber producing open flame means jetting downwardly with said chamber and providing said hot gas stream therein, baffle wall means disposed around said burner means, said baffle wall means extending downwardly between said burner means and said wall means to at least the level of said feed inlet and distributor means, said baffle wall means dividing said chamber upper portion into inner and outer downwardly opening passages and providing both a liquid splash shield and a heat shield to prevent feed liquid from contacting said burner and heat being radiated directly from said burner onto said feed inlet and distributor means, means for introducing water vapor into said outer passage between said baffle wall means and the opposing portion of said wall means to maintain a high humidity atmosphere therebetween, and at least part of the surfaces of said baffle wall means and said chamber wall means in contact with said high humidity atmosphere being provided with cooling means to cause said introduced water vapor to condense thereon.

25. The evaporator apparatus combination of claim 24 further characterized by said water vapor being introduced in the form of substantially saturated steam, said chamber wall means upper portion immediately above said feed means being equipped with said cooling means to provide a cool condensing surface on said wall means upper portion at the level of said feed introduction, and by at least the portion of said baffle wall means directly opposite said feed means being also equipped with said cooling means to provide another cool condensing surface.

26. A direct heat exchange evaporator for evaporative concentration of water solutions, including vertically-extending wall means enclosing an evaporator chamber, the lower portion of said chamber having an outlet; liquid feed inlet and distributor means in the upper portion of said chamber arranged to distribute the water feed solution to be concentrated around the inside surfaces of said wall means to continuously wet said surfaces below said feed inlet and distributor means with downwardly flowing liquid, said liquid exiting through said chamber outlet; and tubular hot gas supply means centrally located in the upper portion of said chamber and extending downwardly therein to direct a stream of hot gas downwardly through said chamber in heat radiation relation with inner walls thereof and exiting through said chamber outlet; wherein the improvement comprises: said evaporator chamber wall means including upper and intermediate portions of circular cross-section, the said upper portion being of larger diameter than said intermediate portion and being connected thereto by an inwardly extending ledge portion of generally annular configuration, said liquid feed means being arranged to introduce said feed onto said ledge portion for distributing flow therearound, the inner corner portions of said ledge connecting with said intermediate chamber portion for providing smooth continuous flow of said feed downwardly over the inner wall surfaces of said intermediate chamber portion, baffle wall means disposed around said tubular hot gas supply means in outwardly spaced relation thereto and extending downwardly to at least the level of the said ledge portion of said feed inlet distribution means while being spaced inwardly therefrom, said baffle wall means providing both a liquid splash shield and heat radiation shield to prevent feed liquid from splashing onto said tubular gas supply means and heat from being radiated from said tubular means directly on said feed inlet and distribution means, and liquid-gas intermixing means disposed across the path of flow of said exiting liquid and hot gas for producing a turbulent intermixture thereof, said intermixing means comprising liquid vortex creating venturi means maintaining a swirling vortex of liquid in the lower portion of said chamber immediately above said venturi means.

27. The evaporator apparatus combination of claim 26 further characterized by the face that said tubular hot gas supply means comprises burner means producing an open flame jetting downwardly within the said intermediate portion of said chamber in direct heat radiation relation with the inner walls thereof over which said solution is flowing.

28. The evaporator apparatus of claim 27 further characterized by the fact said baffle wall means provides a downwardly opening passage around said burner means, and means are provided for introducing a downward flow of air in said passage for enveloping said open flame.

29. The method of recovering solids from a water solution thereof, including the steps of introducing and flowing a water solution of the solids to be recovered downwardly over the interior wall surfaces of a wet-wall evaporator; directing an open flame jet downwardly within said evaporator between the wet walls thereof, said open flame radiating heat directly to the flowing solution on said walls for evaporation of water therefrom and forming hot combustion gases within said evaporator; and intermixing said heated solution with said combustion gases by removing them concurrently through a restricted outlet at the bottom of said evaporator, said intermixing transferring sensible heat from said gases to said solution for further evaporation of water, part of the dissolved solids being converted to precipitated solids by the said evaporations; wherein the improvement comprises: generating a downwardly flowing annular stream of air in the upper portion of said evaporator, said stream enclosing said open flame jet and providing an air screen therearound for preventing fine droplets of said solution from coming into contact with said flame, whereby the formation is substantially avoided of extremely fine solids which would interfere with solids recovery, and filtering said solution after removal from said evaporator to separate said precipitated solids from the residual solution.

30. In a direct heat exchange evaporator for evaporative concentration of water solutions subject to scaling, including wall means enclosing an evaporator chamber having upper and lower portions, the lower portion of said chamber being provided with an outlet for removal of liquid and gas; liquid feed inlet means for introducing the water solution to be concentrated into said evaporator chamber, said solution being in contact with said wall means in the lower portion of said chamber, at least the upper part of the wall means enclosing said upper chamber portion being above the upper level of contact of said water solution with said wall means; hot gas supply means located in the upper portions of said chamber and directing a stream of hot gas downwardly into said chamber in the gener direction of said outlet, liquid-gas intermixing means disposed across the path of flow of the liquid and hot gas exiting from said chamber through said outlet; wherein the improvement comprises: means for introducing water vapor into said chamber upper portion in contact with the inner surfaces of said wall means upper part above said upper level of said solution, and means for cooling said wall means upper part immediately above said upper level of said solution effective for condensing said introducing water vapor upon the cooled inner surfaces to wash said cooled surfaces with condensed water.

31. The method of operating an evaporator for concentration of aqueous solutions subject to scaling by direct contact with hot gases, wherein said evaporator includes an evaporator chamber with upper and lower portions enclosed by wall means, the lower portion of which provides an outlet, liquid feed inlet means for introducing the water solution to be concentrated into said chamber, said solution being in wetting contact with said wall means only to a level thereon maintained by said feed inlet means and above said level said wall means being exposed to hot gas heat in a vapor space in the upper portion of said chamber; hot gas providing means in the upper portion of said chamber directing a stream of hot gas downwardly within said chamber, said hot gas and said aqueous solution exiting through said chamber outlet for heat exchange admixture; comprising the steps of:
 a. introducing water vapor into said vapor space separately from said solution to be concentrated, said water vapor being in contact with said exposed upper portion of said wall means and being effective to maintain a high humidity atmosphere in said vapor space, and
 b. continuously cooling at least part of the said exposed upper portion of said wall means by applying a stream of coolant to the outside thereof for indirect heat exchange, said cooling being sufficient to cause said water vapor to condense continuously thereon and wash the cooled interior surfaces with the condensed water vapor, said cooled part of said exposed upper portion extending to said level of wetting contact with said solution to be concentrated.

32. Apparatus for heating a water solution of inverse solubility salts in a closed heat chamber having interior surfaces, an inlet, and an outlet, comprising means for supplying said solution to the heat chamber interior surfaces through said inlet, heat source means arranged for supplying hot gaseous heat to said heat chamber for turbulent intermixing contact with said solution to heat same for concurrent exit through said outlet, means for assuring that the interior surfaces within said heat chamber having any contact with said solution are maintained at a temperature less than the temperature of said solution to prevent precipitation of the inverse solubility salts thereon, and means for wetting with condensed water vapor all solution-wetted but hot gas heat-exposed interior wall surfaces contacted by said solution to prevent evaporative drying of the salts in said feed stock on any said gas heat-exposed interior surface, said wetting means including means for introducing water vapor separately from said solution.

33. The method of preventing scaling while heating an aqueous liquid feed stock subject to scaling, said method being carried out in a closed heat chamber providing interior surfaces having a lower first portion and an upper second portion, an inlet, and an outlet, comprising the steps of:
 a. continuously supplying said liquid feed stock to said heat chamber through said inlet;
 b. continuously supplying hot gas heat to said heat chamber for turbulent intermixing and radiant heat contact with said feed stock prior to concurrent exit through said outlet;
 c. flowing the feed stock in said chamber in a manner to cause no contact of said liquid feed stock with any interior surface having a temperature greater than the temperature of said feed stock, and
 d. wetting all interior surfaces contacted by said feed stock by
  i. continuously flowing the liquid feed stock onto said first portion thereof, and
  ii. providing wetting means on all the said second portions of said interior surfaces which are discontinuously contacted by said feed stock, said wetting means including introducing water vapor separately from said feed stock and bringing said water vapor in condensed form into wetting contact with said second surface portions, said wetting of said interior surfaces thereby preventing evaporative drying on all solution-wetted but hot gas heat-exposed interior wall surfaces of said closed chamber.

* * * * *

PO-1050
(5/69)

UNITED STATES PATENT OFFICE
CERTIFICATE OF CORRECTION

Patent No. 3,870,585     Dated March 11, 1975

Inventor(s) TOMMY CARTER KEARNS AND DONALD A. STOLTENBERG

It is certified that error appears in the above-identified patent and that said Letters Patent are hereby corrected as shown below:

```
Column 21, line 66, change "and" to --to--.
Column 21, line 67, delete "and".
Column 22, line 15, delete "-" between solution and contacted.
Column 24, line 22, add --and-- between inlet and distribution.
Column 24, line 36, change "face" to --fact--.
Column 25, line 21, change "gener" to --general--.
```

This certificate supersedes Certificate of Correction issued July 8, 1975.

Signed and Sealed this sixteenth Day of December 1975

[SEAL]

Attest:

RUTH C. MASON
*Attesting Officer*

C. MARSHALL DANN
*Commissioner of Patents and Trademarks*